(12) United States Patent
Venderbosch et al.

(10) Patent No.: US 7,091,267 B2
(45) Date of Patent: Aug. 15, 2006

(54) RESINOUS COMPOSITIONS, METHOD OF MANUFACTURE THEREOF AND ARTICLES FABRICATED FROM THE COMPOSITION

(75) Inventors: Robert W. Venderbosch, Bergen op Zoom (NL); Sjef G. Berndsen, Rilland (NL); William A. Kernick, III, Evansville, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/391,093

(22) Filed: Mar. 18, 2003

(65) Prior Publication Data

US 2003/0181603 A1 Sep. 25, 2003

Related U.S. Application Data

(60) Provisional application No. 60/366,137, filed on Mar. 19, 2002.

(51) Int. Cl.
*C08L 69/00* (2006.01)
*C08L 57/00* (2006.01)

(52) U.S. Cl. .............. 524/154; 524/127; 524/129; 524/141; 524/147; 525/67; 525/92 A; 525/92 E; 525/133; 525/146

(58) Field of Classification Search ................ 525/67, 525/92 A, 92 E, 133, 146
See application file for complete search history.

(56) References Cited

U.S. PATENT DOCUMENTS

| 3,544,514 | A |  | 12/1970 | Hermann et al. |
| 3,635,895 | A |  | 1/1972 | Kramer |
| 3,671,487 | A |  | 6/1972 | Abolins |
| 3,723,373 | A |  | 3/1973 | Lucas |
| 4,001,184 | A |  | 1/1977 | Scott |
| 4,092,288 | A | * | 5/1978 | Calkins et al. ............... 524/154 |
| 4,217,438 | A |  | 8/1980 | Brunelle et al. |
| 5,380,795 | A | * | 1/1995 | Gosens et al. ................ 525/67 |
| 5,712,023 | A | * | 1/1998 | Nakajima et al. ......... 428/195.1 |
| 6,133,360 | A | * | 10/2000 | Barren et al. ................ 524/431 |
| 6,174,944 | B1 |  | 1/2001 | Chiba et al. |
| 6,479,598 | B1 | * | 11/2002 | Lewtas et al. ................ 526/69 |
| 2002/0115762 | A1 | * | 8/2002 | Chung et al. ................ 524/161 |

FOREIGN PATENT DOCUMENTS

| JP |  | 58174438 | * | 10/1983 |
| JP |  | 01123860 | * | 5/1989 |
| JP | 1996-199059 | A |  | 8/1996 |
| JP | 2000-63651 |  |  | 2/2000 |

OTHER PUBLICATIONS

Arakawa Chemical Industries, Ltd.; Akron ISO 9002; Mar. 1995.
Eastman; Comprehensive Product Data Sheet; Kristalex F100 Hydrocarbon Resin.

* cited by examiner

*Primary Examiner*—David J. Buttner

(57) ABSTRACT

Disclosed are resinous compositions with excellent balance of impact, heat, flow and environmental stress crack resistance, comprising (i) at least one aromatic polycarbonate, (ii) at least one low molecular weight hydrocarbon resin derived from petroleum $C_5$–$C_9$ feedstock and (iii) optionally a second thermoplastic resin which is not polycarbonate resin, (iv) optionally a rubber modified graft copolymer, and (v) optionally a polymeric or non-polymeric organic phosphorus species. Also disclosed is a method for the manufacture of the compositions and for the manufacture of articles thereof.

14 Claims, No Drawings

RESINOUS COMPOSITIONS, METHOD OF MANUFACTURE THEREOF AND ARTICLES FABRICATED FROM THE COMPOSITION

CROSS-REFERENCE TO RELATED APPLICATIONS

This application is related to and claims priority from Provisional Application No. 60/366,137 filed on Mar. 19th, 2002, the entire contents of which are incorporated.

FIELD OF THE INVENTION

The present invention relates to thermoplastic compositions based on polycarbonates, which contain low molecular weight hydrocarbon resins derived from petroleum $C_5$–$C_9$ feedstock for improved properties, a method of manufacture thereof and articles fabricated from the composition.

BACKGROUND OF THE INVENTION

Thermoplastic resins comprising a polycarbonate resin have been steadily extending their use in various fields, such as automobile parts, appliances parts, and office automation equipment parts, because of their high mechanical strength, good appearance, good electric properties, flammability characteristics and superior processability allowing part integration and mass production. In these fields, in order to produce large-sized and thin-walled articles and to reduce the molding cycle, there has been an increasing demand for thermoplastic resins to have improved flow, while retaining other properties like heat, and toughness. It is further desirable to improve the environmental stress crack resistance.

To improve the flow of polycarbonate or polycarbonate-styrenic resin blends it has been described in JP-A-08-199059 and JP-A-2000-63651 to use terpene resins.

SUMMARY OF THE INVENTION

The invention relates to compositions with excellent balance of impact strength, heat resistance and flow, comprising (i) at least one aromatic polycarbonate, (ii) at least one low molecular weight hydrocarbon resin derived from petroleum $C_5$–$C_9$ feedstock and (iiii) optionally a second thermoplastic resin which is not polycarbonate resin, (iv) optionally a rubber modified graft copolymer, and (v) optionally a polymeric or non-polymeric organic phosphorus species. In one other aspect the invention relates to compositions with an excellent balance of impact strength, heat resistance, flow and environmental stress crack resistance.

The invention further relates to a method to manufacture thermoplastic compositions with an improved balance of impact strength, heat resistance and flow and optionally improved environmental stress crack resistance. In a further aspect the invention relates to articles manufactured out of the thermoplastic composition.

DETAILED DESCRIPTION OF THE INVENTION

The compositions of the present invention encompass those comprising at least one aromatic polycarbonate resin and at least one low molecular weight hydrocarbon resin derived from petroleum $C_5$–$C_9$ feedstock, optionally in combination with one or more of the following: a) at least one of a second thermoplastic resin which is not a polycarbonate resin, b) a rubber modified graft copolymer, c) a combination of at least one rubber modified graft copolymer and at least one of a second thermoplastic resin which is not a polycarbonate resin, and d) a flame retardant.

A. Aromatic Polycarbonate Component.

The resinous compositions of the present invention comprise at least one aromatic polycarbonate resin. Aromatic polycarbonate resins suitable for use in the present invention comprise structural units derived from at least one dihydric phenol and a carbonate precursor. Suitable dihydric phenols include those represented by the formula (1):

wherein D comprises a divalent aromatic radical. In various embodiments, D has the structure of formula (II);

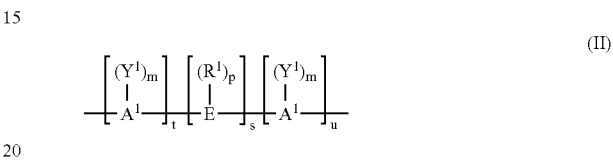

wherein $A^1$ represents an aromatic group such as phenylene, biphenylene, naphthylene, etc. In some embodiments, E may be an alkylene or alkylidene group including, but not limited to, methylene, ethylene, ethyl idene, propylene, propylidene, isopropylidene, butylene, butylidene, isobutylidene, amylene, amylidene, isoamylidene. When E is an alkylene or alkylidene group, it may also consist of two or more alkylene or alkylidene groups connected by a moiety different from alkylene or alkylidene, such as an aromatic linkage; a tertiary amino linkage; an ether linkage; a carbonyl linkage; a silicon-containing linkage; or a sulfur-containing linkage including, but not limited to, sulfide, sulfoxide, sulfone; or a phosphorus-containing linkage including, but not limited to, phosphinyl, phosphonyl.

In other embodiments, E may be a cycloaliphatic group including, but not limited to, cyclopentyl idene, cyclohexyl idene, 3,3,5-trimethylcyclohexyl idene, methylcyclohexylidene, 2-[2.2.1]-bicycloheptylidene, neopentylidene, cyclopentadecylidene, cyclododecylidene, adamantylidene; a sulfur-containing linkage, such as sulfide, sulfoxide or sulfone; a phosphorus-containing linkage, such as phosphinyl or phosphonyl; an ether linkage; a carbonyl group; a tertiary nitrogen group; or a silicon-containing linkage such as silane or siloxy. $R^1$ represents hydrogen or a monovalent hydrocarbon group such as alkyl, aryl, aralkyl, alkaryl, or cycloalkyl.

In various embodiments, a monovalent hydrocarbon group of $R^1$ may be halogen-substituted, particularly fluoro- or chloro-substituted, for example as in dichloroalkylidene. $Y^1$ may be an inorganic atom including, but not limited to, halogen (fluorine, bromine, chlorine, iodine); an inorganic group including, but not limited to, nitro; an organic group including, but not limited to, a monovalent hydrocarbon group such as alkyl, aryl, aralkyl, alkaryl, or cycloalkyl, or an oxy group such as $OR^2$, wherein $R^2$ is a monovalent hydrocarbon group such as alkyl, aryl, aralkyl, alkaryl, or cycloalkyl; it being only necessary that $Y^1$ be inert to and unaffected by the reactants and reaction conditions used to prepare a polycarbonate. In some particular embodiments, $Y^1$ comprises a halo group or $C_1$–$C_6$ alkyl group. The letter "m" represents any integer from and including zero through the number of positions on $A^1$ available for substitution; "p" represents an integer from and including zero through the number of positions on E available for substitution; "t" represents an integer equal to at least one; "s" is either zero or one; and "u" represents any integer including zero.

When more than one Y1 substituent is present as represented by formula (II) above, they may be the same or different. When more than one R1 substituent is present, they may be the same or different. Where "s" is zero in formula (II) and "u" is not zero, the aromatic rings are directly joined with no intervening alkylidene or other bridge. The positions of the hydroxyl groups and Y1 on the aromatic residues A1 can be varied in the ortho, meta, or para positions and the groupings can be in vicinal, asymmetrical or symmetrical relationship, where two or more ring carbon atoms of the aromatic residue are substituted with Y1 and hydroxyl groups.

Some illustrative, non-limiting examples of dihydric phenols of formula (I) include the dihydroxy-substituted aromatic hydrocarbons disclosed by name or formula (generic or specific) in U.S. Pat. No. 4,217,438.

In some embodiments of the invention dihydric phenols include 6-hydroxy-1-(4'-hydroxyphenyl)-1,3,3-trimethylindane, 4,4'-(3,3,5-trimethylcyclohexylidene)diphenol; 1,1-bis(4-hydroxy-3-methylphenyl)cyclohexane; 2,2-bis(4-hydroxyphenyl)propane (commonly known as bisphenol-A); 4,4-bis(4-hydroxyphenyl)heptane; 2,2-bis(4-hydroxy-3,5-dimethylphenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,4'-dihydroxydiphenylmethane; bis(2-hydroxyphenyl)methane; bis(4-hydroxy-phenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(3-phenyl-4-hydroxyphenyl)-propane; bis(4-hydroxyphenyl)cyclohexylnethane; 2,2-bis(4-hydroxyphenyl)-1-phenylpropane; 3,5,3',5'-tetrachloro-4,4'-dihydroxyphenyl)propane; 2,4'-dihydroxyphenyl sulfone; 2,6-dihydroxy naphthalene; 6,6'-dihydroxy-3,3,3',3'-tetramethyl-1,1'-spirobiindane (sometimes know as "SBI"); hydroquinone, resorcinol; C1–3 alkyl-substituted resorcinols. In a particular embodiment, the dihydric phenol comprises bisphenol A.

Suitable dihydric phenols also include those containing indane structural units such as represented by the formula (III), which compound is 3-(4-hydroxyphenyl)-1,1,3-trimethylindan-5-ol, and by the formula (IV), which compound is 1-(4-hydroxyphenyl)-1,3,3-trimethylindan-5-ol:

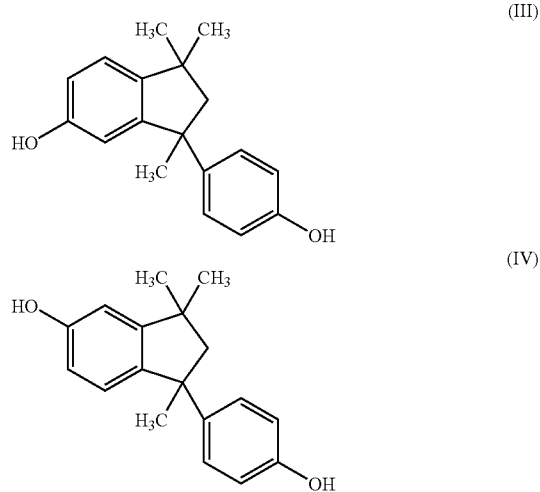

In various embodiments, the carbonate precursor 1 or preparing polycarbonates include at least one carbonyl halide, carbonate ester or haloformate. The carbonyl halides which can be employed herein are carbonyl chloride, carbonyl bromide and mixtures thereof. Typical carbonate esters which may be employed herein include, but are not limited to, diaryl carbonates, including, but not limited to, diphenylcarbonate, di(halophenyl)carbonates, di(chlorophenyl)carbonate, di(bromophenyl)carbonate, di(trichlorophenyl)carbonate, di(tribromophenyl)carbonate; di(alkylphenyl)carbonates, di(tolyl)carbonate; di(naphthyl)carbonate, di(chloronaphtllyl)carbonate, phenyl tolyl carbonate, chlorophenyl chloronaphthyl carbonate, di(methyl salicyl)carbonate, and mixtures thereof. The haloformates suitable for use herein include bishaloformates of dihydric phenols, which include, but are not limited to, bischloroformates of hydroquinone; bisphenol-A; 3-(4-hydroxyphenyl)-1,1,3-trimethylindan-5-ol; 1-(4-hydroxyphenyl)-1,3,3-trimethylindan-5-ol; 4,4'-(3,3,5-trimethylcyclohexylidene)diphenol; 1,1-bis(4-hydroxy-3-methylphenyl)cyclohexane, and the like; bischloroformate-terminated polycarbonate oligomers such as oligomers comprising hydroquinone, bisphenol-A, 3-(4-hydroxyphenyl)-1,1,3-trimethylindan-5-ol; 1-(4-hydroxyphenyl)-1,3,3-trimethylindan-5-ol; 4,4'-(3,3,5-trimethylcyclohexylidene)diphenol, 1,1-bis(4-hydroxy-3-methylphenyl)cyclohexane, or the like; and bishaloformates of glycols including, but not limited to, bishaloformates of ethylene glycol, neopentyl glycol, and polyethylene glycol. Mixtures of haloformates may be employed.

In a particular embodiment, carbonyl chloride, also known as phosgene, is employed. In another particular embodiment, diphenylcarbonate is employed. Polycarbonate resins are made by known methods, such as, for example, interfacial polymerization, transesterification, solution polymerization or melt polymerization.

Suitable aromatic polycarbonate resins include linear aromatic polycarbonate resins and branched aromatic polycarbonate resins. The composition may comprise a blend of two or more linear polycarbonates, a blend of two or more branched polycarbonates or a blend of one or more linear polycarbonates with one or more branched polycarbonates.

Suitable linear aromatic polycarbonates resins include, for example, bisphenol A polycarbonate resin. Suitable branched polycarbonates are known and are made in various embodiments by reacting a polyfunctional aromatic compound with a dihydric phenol and a carbonate precursor to form a branched polymer, see generally, U.S. Pat. Nos. 3,544,514, 3,635,895 and 4,001,184. The polyfunctional compounds are generally aromatic and contain at least three functional groups which are carboxyl, carboxylic anhydrides, phenols, haloformates or mixtures thereof, such as, for example, 1,1,1-tri(4-hydroxyphenyl)ethane, 1,3,5,-trihydroxy-benzene,trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic dianhydride. In some particular embodiments, polyfunctional aromatic compounds are 1,1,1-tri(4-hydroxyphenyl)ethane, trimellitic anhydride or trimellitic acid or their haloformate derivatives.

In a particular embodiment, the polycarbonate resin component of the present invention is a linear polycarbonate resin derived from bisphenol A and phosgene. In some particular embodiments, the weight average molecular weight of the polycarbonate resin is in one embodiment from about 10,000 to about 200,000 grams per mole ("g/mol"); in another embodiment from about 20,000 to about 100,000 g/mol; in another embodiment from about 30,000 to about 80,000 g/mol; in another embodiment from about 40,000 to about 60,000 g/mol; and in still another embodiment from about 40,000 to about 50,000 g/mol, all as determined by gel permeation chromatography relative to polystyrene standards. Such resins exhibit an intrinsic viscosity in one embodiment of about 0.1 to about 1.5 deciliters per gram, in another embodiment of about 0.35 to about 0.9 deciliters per grain, in another embodiment of about 0.4 to about 0.6 deciliters per gram, and in still another embodiment of about 0.48 to about 0.54 deciliters per gram, all measured in methylene chloride at 25° C.

In a polycarbonate-containing blend, there may an improvement in melt flow and/or other physical properties when one molecular weight grade of a polycarbonate is combined with a proportion of a relatively lower molecular weight grade of similar polycarbonate. Therefore, the present invention encompasses compositions comprising only one molecular weight grade of a polycarbonate and also compositions comprising two or more molecular weight grades of polycarbonate. When two or more molecular weight grades of polycarbonate are present, then the weight average molecular weight of the lowest molecular weight polycarbonate is in one embodiment about 10% to about 95%, in another embodiment about 40% to about 85%, and in still another embodiment about 60% to about 80% of the weight average molecular weight of the highest molecular weight polycarbonate.

In one representative, non-limiting embodiment polycarbonate-containing blends include those comprising a polycarbonate with weight average molecular weight between about 40,000 and about 48,000 combined with a polycarbonate with weight average molecular weight between about 25,000 and about 35,000 (in all cases relative to polystyrene standards). When two or more molecular weight grades of polycarbonate are present, the weight ratios of the various molecular weight grades may range from about 1 to about 99 parts of one molecular weight grade and from about 99 to about 1 parts of any other molecular weight grades. In some embodiments a mixture of two molecular weight grades polycarbonate is employed, in which case the weight ratios of the two grades may range in one embodiment from about 99:1 to about 1:99, in another embodiment from about 80:20 to about 20:80, and in still another embodiment from about 70:30 to about 50:50.

In another embodiment, the polycarbononate component is a copolymer, for instance, a linear multi-block copolymer of bisphenol A polycarbonate and polydimethylsiloxane. In yet another embodiment, the polycarbonate component is a blend of a polycarbonate with a copolymer of a linear multi-block copolymer of bisphenol A polycarbonate and polydimethylsiloxane. The blend preferably comprises 1–10 wt % of siloxane units.

In another embodiment the polycarbonate can be a polyestercarbonate such as for example a copolymer derived from one or more dihydric phenol compounds as mentioned above, a carbonate precursor and a phtalic acid derivate.

Since not all manufacturing processes for making a polycarbonate are capable of making all molecular weight grades of that constituent, the present invention encompasses compositions comprising two or more molecular weight grades of polycarbonate in which each polycarbonate is made by a different manufacturing process. In one particular embodiment the instant invention encompasses compositions comprising a polycarbonate made by an interfacial process in combination with a polycarbonate of different weight average molecular weight made by a melt process.

The amount of polycarbonate present in the compositions of the present invention is in one embodiment in a range of between about 10 wt % and about 96% wt %, and in another embodiment in a range of between about 40 wt % and about 80 wt %, based on the weight of the entire composition.

B. Second Thermoplastic Resin

The resinous compositions of the present invention may optionally comprise at least one of a second thermoplastic resin, which is not a polycarbonate resin and which forms a second phase in the polycarbonate-comprising composition. The second thermoplastic resin comprises one or more thermoplastic polymers, and exhibits a glass transition temperature ($T_g$) in one embodiment of greater than about 25° C., in another embodiment of greater than or equal to about 90° C. and in still another embodiment of greater than or equal to about 100° C. As referred to herein, the $T_g$ of a polymer is the $T_g$ value as measured by differential scanning calorimetry (heating rate 20° C./minute, with the $T_g$ value being determined at the inflection point).

In a particular embodiment, the second thermoplastic resin comprises one or more polymers each having structural units derived from one or more monomers selected from the group consisting of vinyl aromatic monomers, monoethylenically unsaturated nitrile monomers, and $C_1$–$C_{12}$ alkyl (meth)acrylate monomers.

Suitable vinyl aromatic monomers comprise, e.g., styrene and substituted styrenes having one or more alkyl, alkoxyl, hydroxyl or halo substituent group attached to the aromatic ring, including, e.g., alpha-methyl styrene, p-methyl styrene, vinyl toluene, vinyl xylene, trimethyl styrene, butyl styrene, chlorostyrene, dichlorostyrene, bromostyrene, p-hydroxystyrene, methoxystyrene and vinyl-substituted condensed aromatic ring structures, such as, e.g., vinyl naphthalene, vinyl anthracene, as well as mixtures of vinyl aromatic monomers.

As used in the present context, the term "monoethylenically unsaturated nitrile monomer" means an acyclic compound that comprises a single nitrile group and a single site of ethylenic unsaturation per molecule and includes, e.g., acrylonitrile, methacrylonitrile, and alpha-chloro acrylonitrile.

The terminology "(meth)acrylate monomers" refers collectively to acrylate monomers and methacrylate monomers. Suitable $C_1$–$C_{12}$ alkyl (meth)acrylate monomers comprise $C_1$–$C_{12}$ alkyl acrylate monomers, e.g., ethyl acrylate, butyl acrylate, iso-pentyl acrylate, n-hexyl acrylate, 2-ethyl hexyl acrylate, and their $C_1$–$C_{12}$ alkyl methacrylate analogs such as, e.g., methyl methacrylate, ethyl methacrylate, propyl methacrylate, isopropyl methacrylate, butyl methacrylate, hexyl methacrylate, and decyl methacrylate.

In a particular embodiment, the second thermoplastic resin comprises a vinyl aromatic polymer having first structural units derived from one or more vinyl aromatic monomers, for example styrene, and having second structural units derived from one or more monoethylenically unsaturated nitrile monomers, for example acrylonitrile. The second thermoplastic resin comprises in some embodiments from about 55 to about 99 wt %, and in other embodiments from about 60 to about 90 wt %, structural units derived from styrene and in some embodiments from about 1 to about 45 wt %, and in other embodiments from about 10 to about 40 wt %, structural units derived from acrylonitrile.

In a particular embodiment the weight average molecular weight of a second thermoplastic resin is from about 50,000 to about 200,000 g/mol. relative to polystyrene standards. In another embodiment, the weight average molecular weight of the second thermoplastic resin is from 1,000,000 to 3,000,000.

The second thermoplastic resin may, provided that the $T_g$ limitation for the resin is satisfied, optionally include structural units derived from one or more other copolymerizable monoethylenically unsaturated monomers such as, e.g., monoethylenically unsaturated carboxylic acids such as, e.g., acrylic acid, methacrylic acid, and itaconic acid; hydroxy $C_1$–$C_{12}$ alkyl (meth)acrylate monomers such as, e.g., hydroxyethyl methacrylate; $C_4$–$C_{12}$ cycloalkyl (meth) acrylate monomers such as e.g., cyclohexyl methacrylate; (meth)acrylamide monomers such as e.g., acrylamide and methacrylamide; maleimide monomers such as, e.g., N-alkyl maleimides, N-aryl maleimides; maleic anhydride; and vinyl esters such as, e.g., vinyl acetate and vinyl propionate. As used in the present context the term "$C_4$–$C_{12}$ cycloalkyl" means a cyclic alkyl substituent group having from 4 to 12 carbon atoms per group and the term "(meth) acrylamide" refers collectively to acrylamides and methacrylamides.

In another embodiment the second thermoplastic resin can be thermoplastic polyester. The polyester may be fully aromatic, partially aromatic or fully alicyclic. Examples of suitable polyesters are those designated as PBT, PET or PCCD.

When present, the amount of second thermoplastic resin present in the compositions of the present invention is in one embodiment in a range of between about 0.1 wt % and about 50 wt %. In another embodiment in a range of between about 0.1 wt % and about 25 wt %, in another embodiment in a range of between about 5 wt % and about 20 wt %, and still in another embodiment in a range of between about 1 wt % and about 20 wt %.

In one embodiment of the invention, the second component is a "SAN" or styrene acrylonitrile, in the range of about 4 and 30 wt %.

The resinous compositions of the present invention may optionally comprise at least one rubber modified graft copolymer comprising a discontinuous rubber phase dispersed in a continuous rigid thermoplastic phase, wherein at least a portion of the rigid thermoplastic phase is chemically grafted to the rubber phase. Hereinafter rubber modified graft copolymer is sometimes referred to as rubber modified thermoplastic resin.

In one embodiment rubber modified graft copolymers comprise those made by a bulk or, synonymously, mass, polymerization process. In another embodiment rubber modified graft copolymers comprise those made by emulsion polymerization.

Suitable rubbers for use in making the rubber phase comprise those having a glass transition temperature ($T_g$) of in one embodiment less than or equal to 25° C., in another embodiment less than or equal to 0° C., and in still another embodiment less than or equal to minus 30° C. In one embodiment the rubber comprises a polymer, often a linear polymer, having structural units derived from one or more conjugated diene monomers. Suitable conjugated diene monomers comprise, e.g., 1,3-butadiene, isoprene, 1,3-heptadiene, methyl-1,3-pentadiene, 2,3-dimethylbutadiene, 2-ethyl-1,3-pentadiene, 1,3-hexadiene, 2,4-hexadiene, dichlorobutadiene, bromobutadiene and dibromobutadiene as well as mixtures of conjugated diene monomers. In particular embodiments the conjugated diene monomer is at least one of 1,3-butadiene or isoprene.

The rubber may optionally include structural units derived from one or more copolymerizable monoethylenically unsaturated monomers selected from $C_2$–$C_8$ olefin monomers, vinyl aromatic monomers, monoethylenically unsaturated nitrile monomers, and $C_1$–$C_{12}$ alkyl (meth)acrylate monomers. As used herein, the term "$C_2$–$C_8$ olefin monomers" means a compound having from 2 to 8 carbon atoms per molecule and having a single site of ethylenic unsaturation per molecule. Suitable $C_2$–$C_8$ olefin monomers comprise, e.g., ethylene, propene, 1-butene, 1-pentene, and heptene. Suitable vinyl aromatic monomers, monoethylenically unsaturated nitrile monomers, and $C_1$–$C_{12}$ alkyl (meth) acrylate monomers comprise those set forth above in the description of the second thermoplastic resin.

In a particular embodiment, the rubber is a polybutadiene homopolymer. In another embodiment, the rubber is a copolymer, for example a block copolymer, comprising structural units derived from one or more conjugated diene monomers and up to 50 percent by weight ("wt %") structural units derived from one or more monomers selected from vinyl aromatic monomers and monoethylenically unsaturated nitrile monomers, such as, for example, a styrene-butadiene copolymer, an acrylonitrile-butadiene copolymer or a styrene-butadiene-acrylonitrile copolymer.

In another particular embodiment, the rubber is a styrene-butadiene block copolymer that contains from about 50 to about 95 wt % structural units derived from butadiene and from about 5 to about 50 wt % structural units derived from styrene. In another particular embodiment the rubber comprises structural units derived from butyl acrylate. In another particular embodiment the rubber is an ethylene-propylene-diene modified rubber.

The elastomeric rubber phase may be made by aqueous emulsion polymerization in the presence of a free radical initiator, a polyacid surfactant and, optionally, a chain transfer agent, and coagulated to form particles of elastomeric phase material. Suitable initiators comprise conventional free radical initiators such as, e.g., an organic peroxide compound, such as e.g., benzoyl peroxide; a persulfate compound, such as, e.g., potassium persulfate; an azonitrile compound such as, e.g., 2,2'-azobis-2,3,3-trimethylbutyronitrile; or a redox initiator system, such as, e.g., a combination of cumene hydroperoxide, ferrous sulfate, tetrasodium pyrophosphate and a reducing sugar or sodium formaldehyde sulfoxylate. Suitable chain transfer agents comprise, for example, a $C_9$–$C_{13}$ alkyl mercaptan compound such as nonyl mercaptan, or t-dodecyl mercaptan.

The emulsion polymerized particles of elastomeric rubber phase material have a weight average particle size in one embodiment of about 50 to about 1000 nanometers ("nm"), in another embodiment of about 50 to about 800 nm, and in another embodiment of from 100 to 500 nm, as measured by light transmission. In one embodiment of the invention, the particle size is 70 nm. The size of emulsion polymerized elastomeric particles may optionally be increased by mechanical, colloidal or chemical agglomeration of the emulsion polymerized particles according to known techniques.

The rigid thermoplastic resin phase comprises one or more thermoplastic polymers and exhibits a $T_g$ in one embodiment of greater than about 25° C., in another embodiment of greater than or equal to about 90° C. and in still another embodiment of greater than or equal to about 100° C. In a particular embodiment, the rigid thermoplastic phase comprises one or more polymers each having structural units derived from one or more monomers selected from the group consisting of $C_1$–$C_{12}$ alkyl (meth)acrylate monomers, vinyl aromatic monomers and monoethylenically unsaturated nitrile monomers. Suitable vinyl aromatic monomers and monoethylenically unsaturated nitrile monomers and of $C_1$–$C_{12}$ alkyl (meth)acrylate monomers comprise those set forth above in the description of the rubber phase.

In a particular embodiment, the rigid thermoplastic resin phase comprises a vinyl aromatic polymer having first structural units derived from one or more vinyl aromatic monomers, for example styrene, and having second structural units derived from one or more monoethylenically unsaturated nitrile monomers, for example acrylonitrile. The rigid phase comprises in some embodiments from about 55 to about 99 wt %, and in other embodiments from about 60 to about 90 wt %, structural units derived from styrene and in some embodiments from about 1 to about 45 wt %, and in other embodiments from about 10 to about 40 wt %, structural units derived from acrylonitrile.

The relative amount of rubber phase in the rubber modified graft copolymer is in one embodiment in a range between about 2 wt % and about 70 wt %, in another embodiment in a range between about 6 wt % and about 65 wt %, in another embodiment in a range between about 8 wt % and about 50 wt %, in another embodiment in a range between about 10 wt % and about 40 wt %, and in still another embodiment in a range between about 12 wt % and about 24 wt %, based on the weight of the rubber modified graft copolymer.

The amount of grafting that takes place between the rigid thermoplastic phase and the rubber phase varies with the relative amount and composition of the rubber phase. In one embodiment from about 10 to about 90 wt % of the rigid thermoplastic phase is chemically grafted to the rubber phase and from about 10 to about 90 wt % of the rigid thermoplastic phase remains "free", i.e., non-grafted. In another embodiment from about 40 to about 75 wt % of the rigid thermoplastic phase is chemically grafted to the rubber phase and from about 25 to about 60 wt % of the rigid thermoplastic phase remains free.

In a typical embodiment wherein the rubber-modified graft copolymer is made by the emulsion process ("EABS"), the relative amount of the rubber phase is typically in the upper range of the 2–70% range. In another embodiment, wherein the rubber-modified graft copolymer is made by the bulk process ("BABS"), the relative amount of the rubber phase is in the lower range of the 2–70% range. In a third embodiment, the rubber-modified graft copolymer is a blend of BABS and EABS.

In various embodiments, the rigid thermoplastic phase of the rubber modified thermoplastic resin may be formed: (i) solely by polymerization carried out in the presence of the rubber phase or (ii) by addition of one or more separately polymerized rigid thermoplastic polymers to a rigid thermoplastic polymer that has been polymerized in the presence of the rubber phase. In a particular embodiment, one or more separately polymerized rigid thermoplastic polymers is combined with a rigid thermoplastic polymer that has been polymerized in the presence of the rubber phase in order to aid in adjusting the viscosity of the composition of the present invention into some desired range. In a particular embodiment, the weight average molecular weight of the one or more separately polymerized rigid thermoplastic polymers is from about 50,000 to about 200,000 g/mol relative to polystyrene standards.

In another particular embodiment, the rubber modified thermoplastic resin comprises a rubber phase comprising a polymer having structural units derived from one or more conjugated diene monomers, and, optionally, further comprising structural units derived from one or more monomers selected from vinyl aromatic monomers and monoethylenically unsaturated nitrile monomers; and the rigid thermoplastic phase comprises a polymer having structural units derived from one or more monomers selected from vinyl aromatic monomers and monoethylenically unsaturated nitrile monomers. In still another particular embodiment, the rubber phase of the rubber modified thermoplastic resin comprises a polybutadiene or poly(styrene-butadiene) rubber and the rigid phase comprises a styrene-acrylonitrile copolymer.

Each of the polymers of the rubber phase and of the rigid thermoplastic resin phase of the rubber modified thermoplastic resin may, provided that the $T_g$ limitation for the respective phase is satisfied, optionally include structural units derived from one or more other copolymerizable monoethylenically unsaturated monomers such as, e.g., monoethylenically unsaturated carboxylic acids such as, e.g., acrylic acid, methacrylic acid, and itaconic acid; hydroxy $C_1$–$C_{12}$ alkyl (meth)acrylate monomers such as, e.g., hydroxyethyl methacrylate; $C_4$–$C_{12}$ cycloalkyl (meth)acrylate monomers such as e.g., cyclohexyl methacrylate; (meth)acrylamide monomers such as e.g., acrylamide and methacrylamide; maleimide monomers such as, e.g., N-alkyl maleimides, N-aryl maleimides; maleic anhydride; and vinyl esters such as, e.g., vinyl acetate and vinyl propionate. As used in the present context the term "$C_4$–$C_{12}$ cycloalkyl" means a cyclic alkyl substituent group having from 4 to 12 carbon atoms per group and the term "(meth)acrylamide" refers collectively to acrylamides and methacrylamides.

In one embodiment, the rubber phase of rubber modified thermoplastic resin has a particle size of from about 0.1 to about 10 micrometers ("μm"). In another embodiment, from about 0.1 to about 3.0 micrometers, and in another embodiment from about 0.2 to about 2.0 μm.

When present, the amount of rubber modified graft copolymer present in the compositions of the present invention is in one embodiment in a range of between about 0.1 wt % and about 35 wt %, in another embodiment in a range of between about 0.1 wt % and about 20 wt %, in another embodiment in a range of between about 0.2 wt % and about 15 wt %, in another embodiment in a range of between about 0.5 wt % and about 10 wt %, and in still another embodiment in a range of between about 2 wt % and about 14 wt %, based on the weight of the entire composition.

In one embodiment wherein BABS is used, the amount of is about 15 to 30 wt. %. In another embodiment wherein EABS is used, the amount is about 5 to 30 wt. %.

C. Organophosphorous Flame Retardant.

The resinous compositions of the present invention may optionally comprise at least one polymeric or non-polymeric organic phosphorus species selected from the group consisting of phosphate esters, thiophosphate esters, phosphonate esters, thiophosphonate esters, phosphinate esters, thiophosphinate esters, phosphines, including triphenylphosphine, phosphine oxides, including triphenylphosphine oxide and tris(2-cyanoethyl)phosphine oxide, thiophosphine oxides, and phosphonium salts.

In some embodiments, organic phosphorus species are non-polymeric phosphate esters including, for example, alkyl phosphate esters, aryl phosphate esters, resorcinol-based phosphate esters, and bisphenol-based phosphate esters. In other embodiments organic phosphorus species are aromatic phosphates. Illustrative, non-limiting examples of such phosphorus species include triplienylphosphate, tricresylphosphate, resorcinol bis(diphenylphosphate), bisphenol A bis(diphenylphosphate), and other aromatic phosphate esters known in the art.

When present, the organic phosphorus species is present in the compositions of the invention in an amount in one embodiment in a range of between about 0.5 wt % and about 20 wt %. In another embodiment, in a range of between about 1 wt % and about 15 wt %, and in still another embodiment in a range of between about 2 wt % and about 10 wt %, based on the weight of the entire composition.

The term "alkyl" as used in the various embodiments of the present invention is intended to designate both normal alkyl, branched alkyl, aralkyl, and cycloalkyl radicals. In various embodiments normal and branched alkyl radicals are those containing from 1 to about 12 carbon atoms, and include as illustrative non-limiting examples methyl, ethyl, n-propyl, isopropyl, n-butyl, sec-butyl, tertiary-butyl, pentyl, neopentyl, hexyl, heptyl, octyl, nonyl, decyl, undecyl and dodecyl. In various embodiments cycloalkyl radicals represented are those containing from 3 to about 12 ring carbon atoms. Some illustrative non-limiting examples of these cycloalkyl radicals include cyclobutyl, cyclopentyl, cyclohexyl, methylcyclohexyl, and cycloheptyl. In various embodiments aralkyl radicals are those containing from 7 to about 14 carbon atoms; these include, but are not limited to, benzyl, phenylbutyl, phenylpropyl, and phenylethyl. In various embodiments aryl radicals used in the various embodiments of the present invention are those containing from 6 to 12 ring carbon atoms. Some illustrative non-limiting examples of these aryl radicals include phenyl, biphenyl, and naphthyl. Halogen radicals used in some embodiments of the present invention are chlorine and bromine.

D. Low Molecular Weight Hydrocarbon Resin Derived from Petroleum $C_5$–$C_9$ Feedstock.

The present inventors have unexpectedly discovered that the presence of low molecular weight hydrocarbon resins derived from petroleum $C_5$–$C_9$ feedstock results in an improved and balanced combination of flow, heat resistance and impact strength. It has further been discovered according to another aspect of the invention that a subclass of the low molecular weight hydrocarbon resins derived from petroleum $C_5$–$C_9$ feedstock also improves the environmental stress crack resistance.

Low molecular weight hydrocarbon resins derived from petroleum $C_5$–$C_9$ feedstock are derived from unsaturated $C_5$–$C_9$ monomers obtained from petroleum cracking, including olefins, e.g. pentenes, hexenes, heptenes and the like; diolefins, e.g. pentadienes, hexadienes and the like; cyclic olefines and diolefines, e.g. cyclopentene, cyclopentadiene, cyclohexene, cyclohexadiene, methyl cyclopentadiene and the like; cyclic diolefin dienes, e.g., dicyclopentadiene, inethylcyclopentadiene dimer and the like; and aromatic hydrocarbons, e.g. vinyltoluenes, indenes, methylindenes and the like. The resins can additionally be partially or fully hydrogenated.

Mixtures of two or more of the above described resins can be employed where desired.

The molecular weight (number average) of the petroleum feedstock $C_5$–$C_9$ resin weight is preferably less than 5,000, more preferably less than 2,500 and most preferably less than 1250.

The low molecular weight hydrocarbon resin derived from petroleum $C_5$–$C_9$ feedstock is preferably partially or fully hydrogenated. So-called fully hydrogenated resins are usually not completely hydrogenated but only to an extent of about 98–99%. It has been found that partially or fully hydrogenated petroleum feedstock $C_5$–$C_9$ resins not only improve the flow properties but also the stress crack resistance.

According to another aspect of the invention it is preferred to use a partially or fully hydrogenated, even more preferred fully hydrogenated $C_9$ low molecular weight petroleum feedstock resin.

Commercially suitable low molecular weight hydrocarbon resins derived from petroleum $C_5$–$C_9$ feedstock include the following: hydrocarbon resins available from Eastman Chemical under the trademark Piccotac®, the aromatic hydrocarbon resins available from Eastman Chemical under the trademark Picco®, the fully hydrogenated alicyclic hydrocarbon resin based on $C_9$ monomers available from Arakawa Chemical Inc. under the trademark ARKON® and sold, depending on softening point, as ARKON® P140, P125, P115, P100, P90, P70 or the partially hydrogenated hydrocarbon resins sold as ARKON® M135, M115, M 100 and M90, the fully or partially hydrogenated hydrocarbon resin available from Eastman Chemical under the tradename REGALITE® and sold, depending on softening point, as REGALITE® R1100, S1100, R1125, R1090 and R1010, or the partially hydrogenated resins sold as REGALITE® R7100, R9100, S5100 and S7125, the hydrocarbon resins available from Exxon Chemical under the trade ESCOREZ®, sold as the ESCOREZ® 1000, 2000 and 5000 series, based on C5, C9 feedstock and mixes thereof, or the hydrocarbon resins sold as the ESCOREZ® 5300, 5400 and 5600 series based on cyclic and C9 monomers, optionally hydrogenated and the pure aromatic monomer hydrocarbon resins such as for instance the styrene, α-methyl styrene based hydrocarbon resins available from Eastman Chemical under the tradename Kristalex®.

E. Further Optional Components.

In various embodiments, the resinous compositions of the present invention optionally comprise a fluoropolymer in an amount that is effective to provide anti-drip properties to the resin com position. The amount of fluoropolymer present in the compositions is in one embodiment in a range of between about 0.01 wt % and about 2 wt %, and in another embodiment in a range of between about 0.1 wt % and about 1 wt %, based on the weight of the entire composition. Suitable fluoropolymers and methods for making such fluoropolymers are known, see, e.g., U.S. Pat. Nos. 3,671,487 and 3,723,373. Suitable fluoropolymers include homopolymers and copolymers that comprise structural units derived from one or more fluorinated alpha-olefin monomers. The tern "fluorinated alpha-olefin monomer" means an alpha-olefin monomer that includes at least one fluorine atom substituent. Suitable fluorinated alpha-olefin monomers include, e.g., fluoroethylenes such as, e.g., $CF_2=CF_2$, $CHF=CF_2$, $CH_2=CF_2$, $CH_2=CHF$, $CClF=CF_2$, $CCl_2=CF_2$, $CClF=CClF$, $CHF=CCl_2$, $CH_2=CClF$, and $CCl_2=CClF$ and fluoropropylenes such as, e.g., $CF_3CF=CF_2$, $CF_3CH=CHF$, $CF_3CH=CF_2$, $CF_3CH=CH_2$, $CF_3CF=CHF$, $CHF_2CH=CHF$ and $CF_3CF=CH_2$. In a particular embodiment the fluorinated alpha-olefin monomer is one or more of tetrafluoroethylene ($CF_2=CF_2$), chlorotrifluoroethylene ($CClF=CF_2$), vinylidene fluoride ($CH_2=CF_2$) and hexafluoropropylene ($CF_2=CFCF_3$). In various embodiments suitable fluorinated alpha-olefin homopolymers include e.g., poly(tetrafluoroethylene) and poly(hexafluoroethylene).

In other embodiments, suitable fluorinated alpha-olefin copolymers include copolymers comprising structural units derived from two or more fluorinated alpha-olefin copolymers such as, e.g., poly(tetrafluoroethylene-hexafluoroethylene), and copolymers comprising structural units derived from one or more fluorinated monomers and one or more non-fluorinated monoethylenically unsaturated monomers that are copolymerizable with the fluorinated monomers such as, e.g., poly(tetrafluoroethylene-ethylene-propylene) copolymers. Suitable non-fluorinated monoethylenically unsaturated monomers include e.g., alpha-olefin monomers such as, e.g., ethylene, propylene, butene, acrylate monomers such as e.g., methyl methacrylate, butyl acrylate, vinyl ethers, such as, e.g., cyclohexyl vinyl ether, ethyl vinyl ether, n-butyl vinyl ether, vinyl esters such as, e.g., vinyl acetate, vinyl versatate. In a particular embodiment the fluoropolymer particles range in size from about 50 nm to about 500 nm as measured by electron microscopy. In a particular embodiment the fluoropolymer is a poly(tetrafluoroethylene) homopolymer ("PTFE").

Since direct incorporation of a fluoropolymer into a thermoplastic resin composition tends to be difficult, the fluoropolymer may in one embodiment be preblended in some manner with a second polymer to form a concentrate. In another embodiment, a fluoropolymer additive may be made by emulsion polymerization of one or more monoethylenically unsaturated monomers in the presence of aqueous fluoropolymer dispersion to form a second polymer in the presence of the fluoropolymer.

The compositions of the invention may also contain other conventional additives including antistatic agents, stabilizers such as heat stabilizers and light stabilizers, pigments, dyes, UV screeners, inhibitors, plasticizers, flow promoters, auxiliary flame retardants, mold release agents, impact modifiers, ester interchange inhibitors, other anti-drip agents, and fillers. In some embodiments, compositions of the invention comprise either at least one extending filler, or at least one reinforcing filler, or both of at least one extending filler and at least one reinforcing filler. Representative examples of extending fillers comprise carbon black, silica, alumina, magnesia, talc, mica, glass beads, hollow glass beads, and the like. Representative examples of reinforcing fillers comprise carbon fibers, glass fibers, quartz, and the like. Representative examples of mold release agents include pentaerythritol tetrastearate, octyl behenate, and polyethylene. Representative impact modifiers include Metablend S2001, a composite rubber-grafted copolymer with a polydimethylsiloxane content of >50 wt. %.

Method of Making.

In another embodiment, the present invention comprises methods for making the compositions disclosed herein. The compositions of the present invention may be made by combining and mixing the components of the composition under conditions suitable for the formation of a blend of the components, such as for example, by melt mixing using, for example, a two-roll mill, a Banbury mixer or a single screw or twin-screw extruder, and, optionally, then reducing the composition so formed to particulate form, e.g., by pelletizing or grinding the composition.

In some embodiments, one or more components can be added to the composition as an aqueous mixture or solution followed by devolatilization in appropriate processing equipment such as in an extruder. In another embodiment, some of the components may be mixed in aqueous solution and then evaporated to form a material, which can be added to compositions of the invention.

The thermoplastic resin compositions of the present invention can be molded into useful shaped articles by a variety of means such as injection molding, extrusion, rotational molding, blow molding and thermoforming to form articles such as, for example, computer and business machine housings, home appliances.

EXAMPLES

The following examples are included to provide additional guidance to those skilled in the art in practicing the claimed invention. These examples are not intended to limit the invention, as defined in the appended claims, in any manner. In the examples the components are:

(a) PC-1 or bisphenol A polycarbonate made by a melt process with a weight average molecular weight (relative to polystyrene standards) of about 43,000 g/mol.

(b) PC-2 or bisphenol A polycarbonate made by a melt process with a weight average molecular weight (relative to polystyrene standards) of about 59,000 g/mol.

(c) PC-3 or bisphenol A polycarbonate made by an interfacial process process with a weight average molecular weight (relative to polystyrene standards) of about 44,000 g/mol.

(d) PC-4 or bisphenol A polycarbonate made by an interfacial process process with a weight average molecular weight (relative to polystyrene standards) of about 65,000 g/mol.

(e) PC-PDMS a linear mulitblock copolymer of bisphenol A polycarbonate and polydimethylsiloxane (about 20 weight % siloxane).

(f) ABS-1 prepared by a bulk polymerization method, comprising about 17 wt. % grafted polybutadiene.

(g) ABS-2 prepared by emulsion polymerization, comprising 50 to 55 wt. % polybutadiene.

(h) SAN-1 comprising about a 75:25 weight ratio of styrene to acrylonitrile with weight average molecular weight of about 90,000 g/mol (relative to polystyrene standards).

(i) SAN-2 comprising about a 75:25 weight ratio of styrene to acrylonitrile with weight average molecular weight of about 65,000 g/mol (relative to polystyrene standards).

(j) RDP: a flame retardant i.e. resorcinol bis(diphenylphosphate).

(k) BPADP: a flame retardant i.e. bisphenol A bis(diphenylphosphate).

(l) T-SAN, a drip retardant encapsulated poly(tetrafluoroethylene), comprising about 50 weight percent poly(styrene-acrylonitrile) and about 50 weight percent poly(tetrafluoroethylene).

(m) mold release agent, PETS, pentaerythritol tetrastearate, (>90 percent esterified).

(n) Stabilizer 1: a phosphite stabilizer, tris(2,4-di-tert-butylphenylphosphite).

(o) Stabilizer 2: a hindered phenol stabilizer, octadecyl-3-(3,5-di-tert-butyl-4-hydroxyphenyl)propionate.

(p) CB a Carbon Black.

(p) a low molecular weight hydrocarbon resin derived from petroleum $C_5$–$C_9$ feedstock as specified below.

Unless indicated otherwise, each formulation in Table 1 (examples 1 to 6) comprises the following: 63.2 wt %. PC-1, 31.6 wt. % PC-2, and 5 wt. % ABS-1 or 49.9 wt %. PC-1, 24.9 wt. % PC-2 and 25 wt. % ABS-1. In examples where a petroleum feedstock $C_5$–$C_9$ resin as flow modifier additive is used, the additives are added at a level of 5 wt. %, replacing an equal amount of PC wherein the ratio of PC-1/PC-2 is kept constant at 2. All examples in Table 1 additionally contain 0.1 wt. % Stabilizer 1 and 0.1 wt. % Stabilizer 2.

Unless indicated otherwise, each formulation in Table 2 (examples 7 to 11) comprises the following: 67.96 wt. % PC-4, 12.5 wt. % SAN-1, 12.5 wt. % ABS-1, 5.88 wt. % RDP, 0.5 wt. % TSAN, 0.5 wt. % PETS, 0.08 wt. %

Stabilizer 1 and 0.08 wt. % Stabilizer 2. In examples where a petroleum feedstock $C_5$–$C_9$ resin as flow modifier additive is used, the additives are added at a level of 1 or 5 wt. %, replacing an equal amount of PC+SAN and wherein the ratio of SAN/PC is kept constant at 0.184.

Unless indicated otherwise, each formulation in Table 3 (examples 12 to 17) comprises the following, 53.5 wt. % PC (in total), 28 wt. % SAN-1, 18 wt % ABS-2, 0.3 wt. % PETS, 0.1 wt. % Stabilizer 1 and 0.1 wt. % Stabilizer 2. In examples where a petroleum feedstock $C_5$–$C_9$ resin as flow modifier additive is used, the additives are added at a level varying between 2 and 7.5 wt. %, replacing an equal amount of ABS+PC+SAN and wherein the ratio of SAN/PC is kept constant at 0.52.

Unless indicated otherwise, each formulation in Table 4 (examples 18 and 19) comprises the following, 71.16 wt. % PC-1, 11.8 wt. % PC-2, 12 wt. % PC-PDMS, 2 wt. % SAN-2, 2 wt. % BPADP, 0.4 wt. % TSAN, 0.3 wt. % PETS, 0.08 wt. % Stabilizer 1, 0.08 wt. % Stabilizer 2 and 0.18 wt. % CB. In example 19, Arkon P125 is used as a petroleum feedstock $C_5$–$C_9$ resin replacing SAN-2.

Depending on the example, the low molecular weight hydrocarbon resins derived from petroleum $C_5$–$C_9$ feedstock are as follows:
1) A fully hydrogenated $C_9$ petroleum feedstock resin, commercially available as ARKON® P125 from Arakawa Chemical Inc.
2) A non-hydrogenated aromatic $C_5$–$C_9$ petroleum feedstock resin, commercially available as KRISTALEX F100®, from Eastman Chemical B.V.

All samples are compounded on a Werner & Pfleiderer co-rotating twin screw extruder (25 mm screw) and subsequently molded according to ISO294 on a ENGEL injection molding machine (type ES500/110 HLV, clamping force 1100 kN).

The following properties are tested:
1) Melt flow rate (MVR): according to ISO1133 at 260 degrees Celcius using a weight of 2.16 or 5 kg.
2) Melt viscosity: at 260 or 240 degrees Celcius, at a shear rate of 100, 1500 and 10,000 per second, according to ISO11443
3) Vicat B120: according to ISO306.
4) Flammability: tested on 2.3 or 1.6 mm thick specimen according to Underwriters Laboratory UL-94.
5) ESCR, Environmental Stress Crack Resistance, is tested on ISO tensile bars (4 mm thickness) using a 1% strain jig according to ATSM-1693A, resulting in an effective strain of about 1.2%. The test is conducted at 50 degrees Celsius in olive oil. Specimens have been annealed for 16 hrs at 80 Degrees Celsius. The period of time (minutes) until a crack occurs in the specimen and until the specimen breaks is measured.
6) Izod Notched Impact according to ISO180-1A at room temperature on 4 mm thick test bars
7) Tensile Properties including Modulus, Yield Stress, and Elongation at Break, according to ISO527.

The results of the tests are shown in Tables 1–4. As illustrated in the Tables, the compositions of present invention provide a significant improvement in flow and/or ductility as expressed by impact or elongation at break, with only a minor reduction in Vicat. This makes it possible to use less ABS, which gives a further improvement of the flow properties (see examples 13, 14 and 15). Even more remarkable, as shown in Tables 3 and 4, is that the compositions with a hydrogenated low molecular weight hydrocarbon resins derived from petroleum $C_5$–$C_9$ feedstock exhibit a considerable improvement in environmental stress crack resistance providing a unique overall property profile, of flow, impact, heat, flammability and ESCR.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All patents cited herein are incorporated herein by reference.

TABLE 1

| | 1 | 2 | 3 | 4 | 5 | 6 |
|---|---|---|---|---|---|---|
| Ingredient | | | | | | |
| PC-1 | 63.2 | 49.9 | 59.9 | 46.6 | 59.9 | 46.6 |
| PC-2 | 31.6 | 24.9 | 29.9 | 23.2 | 29.9 | 23.2 |
| ABS-1 | 5 | 25 | 5 | 25 | 5 | 25 |
| Arkon P125 | | | 5 | 5 | | |
| Krystalex F100 | | | | | 5 | 5 |
| Stabilizer 1 | 0.1 | 0.1 | 0.1 | 0.1 | 0.1 | 0.1 |
| Stabilizer 2 | 0.1 | 0.1 | 0.1 | 0.1 | 0.1 | 0.1 |
| MVR 260 C/5 kg [cc/10 min] | 28.1 | 35.7 | 32.6 | 38 | 37.6 | 45.9 |
| Melt viscosity [Pa.s] @ 260 degr C. | | | | | | |
| 100/sec | 1385 | 839 | 570 | 765 | 993 | 705 |
| 1500/sec | 470 | 227 | 232 | 197 | 378 | 189 |
| 10000/sec | 120 | 66 | | 58 | 98 | 56 |
| Izod Notched Impact [kJ/m2] | 30.83 | 45.51 | 47.58 | 42.87 | 12.2 | 41.83 |
| Vicat [degr. C.] | 141 | 132.8 | 137.8 | 128.5 | 134.8 | 126.7 |

TABLE 2

| | 7 | 8 | 9 | 10 | 11 |
|---|---|---|---|---|---|
| Ingredient | | | | | |
| PC-4 | 67.96 | 67.11 | 63.73 | 67.11 | 63.73 |
| SAN-1 | 12.5 | 12.35 | 11.73 | 12.35 | 11.73 |
| ABS-1 | 12.5 | 12.5 | 12.5 | 12.5 | 12.5 |
| RDP | 5.88 | 5.88 | 5.88 | 5.88 | 5.88 |
| Arkon P125 | | 1 | 5 | | |
| Krystalex F100 | | | | 1 | 5 |
| T-SAN | 0.5 | 0.5 | 0.5 | 0.5 | 0.5 |
| PETS | 0.5 | 0.5 | 0.5 | 0.5 | 0.5 |
| Stabilizer 1 | 0.08 | 0.08 | 0.08 | 0.08 | 0.08 |
| Stabilizer 2 | 0.08 | 0.08 | 0.08 | 0.08 | 0.08 |
| MVR 260 C/2.16 kg [cc/10 min] | 8.37 | 9 | 9.99 | 8.71 | 11.27 |
| Melt viscosity [Pa.s] @ 260 degr C. | | | | | |
| 100/sec | 512 | 516 | 487 | 469 | 450 |
| 1500/sec | 157 | 153 | 136 | 151 | 137 |
| 10000/sec | 47 | 46 | 42 | 45 | 41 |
| Izod Notched Impact [kJ/m2] | 43.34 | 56.03 | 56.65 | 52.46 | 34.72 |
| Vicat [degr C.] | 113.1 | 112.6 | 111.3 | 111.9 | 108.1 |
| UL94 @ 2.3 mm | | | | | |
| Flame out time 1 [sec] | 0 | 2.2 | 0.2 | 0.6 | 3.4 |
| Flame out time 2 [sec] | 10.2 | 15.2 | 17.4 | 23 | 17.8 |

TABLE 3

|  | 12 | 13 | 14 | 15 | 16 | 17 |
|---|---|---|---|---|---|---|
| Ingredient |  |  |  |  |  |  |
| PC-3 | 7 | 7 | 7 | 7 | 7 | 7 |
| PC-1 | 31.68 | 29.31 | 30.26 | 29.31 | 29.31 | 27.75 |
| PC-2 | 14.82 | 13.91 | 14.27 | 13.91 | 13.91 | 13.82 |
| SAN-1 | 28 | 26.28 | 26.97 | 26.28 | 26.28 | 25.43 |
| ABS-2 | 18 | 18 | 16 | 16 | 18 | 18 |
| Arkon P125 |  | 5 | 5 | 7 |  |  |
| Krystalex F100 |  |  |  |  | 5 | 7.5 |
| PETS | 0.3 | 0.3 | 0.3 | 0.3 | 0.3 | 0.3 |
| Stabilizer 1 | 0.1 | 0.1 | 0.1 | 0.1 | 0.1 | 0.1 |
| Stabilizer 2 | 0.1 | 0.1 | 0.1 | 0.1 | 0.1 | 0.1 |
| MVR 260 C/5 kg [cc/10 min] | 21.9 | 17.3 | 20.5 | 20.9 | 24.9 | 30.0 |
| Melt viscosity [Pa.s] @ 240 degr C. |  |  |  |  |  |  |
| 100/sec | 1018 | 985 | 876 | 860 | 903 | 806 |
| 1500/sec | 224 | 220 | 205 | 197 | 205 | 186 |
| 10000/sec | 60 | 58 | 55 | 53 | 54 | 50 |
| Izod Notched Impact [kJ/m2] | 38 | 40 | 41 | 41 | 39 | 37 |
| Tensile Properties (50 mm/min) |  |  |  |  |  |  |
| Modulus [GPa] | 2.2 | 2.1 | 2.2 | 2.1 | 2.2 | 2.2 |
| Yield stress [MPa] | 56 | 53 | 54 | 53 | 57 | 56 |
| Elongation at break [%] | 68 | 106 | 112 | 63 | 32 | 31 |
| Vicat [degr C.] | 116.5 | 115.0 | 114.6 | 113.8 | 111.1 | 114.9 |
| ESCR in Olive oil at 1.2% strain |  |  |  |  |  |  |
| time to crack [min] | 13 | 47 | 45 | 52 | 11 | 10 |
| time to break [min] | 42 | >150 | >150 | >150 | 27 | 19 |

TABLE 4

|  | 18 | 19 |
|---|---|---|
| Ingredient |  |  |
| PC-1 | 71.16 | 71.16 |
| PC-2 | 11.8 | 11.8 |
| PC-PDMS | 12 | 12 |
| SAN-2 | 2 |  |
| Arkon P125 |  | 2 |
| BPADP | 2 | 2 |
| T-SAN | 0.4 | 0.4 |
| PETS | 0.3 | 0.3 |
| Stabilizer 1 | 0.08 | 0.08 |
| Stabilizer 2 | 0.08 | 0.08 |
| CB | 0.18 | 0.18 |
| MVR 260 C/5 kg [cc/10 min] | 27.1 | 28.3 |
| Melt viscosity [Pa.s] @ 260 degr C. |  |  |
| 100/sec | 399 | 390 |
| 1500/sec | 219 | 212 |
| 10000/sec | 73 | 71 |
| Vicat [degr C.] | 133.9 | 132.7 |
| UL94 @ 1.6 mm |  |  |
| Flame out time 1 [sec] | 0.3 | 0.8 |
| Flame out time 2 [sec] | 2.1 | 2.3 |
| ESCR in Olive oil at 1.2% strain |  |  |
| time to crack [min] | 63 | 134 |
| time to break [min] | 118 | 290 |

The invention claimed is:

1. A polycarbonate resin composition comprising:
   a) at least one aromatic polycarbonate, wherein the polycarbonate is a blend of a first polycarbonate not comprising siloxane units and as a second polycarbonate a linear multiblock copolymer of bisphenol A polycarbonate and polydimethylsiloxane;
   b1) about between 4 wt % and about 30 wt % of a second thermoplastic resin comprising structural units derived from one or more monomers selected from the group consisting of vinyl aromatic monomers, monoethylenically unsaturated nitrile monomers, and $C_1$–$C_{12}$ alkyl (meth)acrylate monomers;
   b2) about between 5 wt % and about 30 wt % of one rubber modified graft copolymer comprising a discontinuous rubber phase dispersed in a continuous rigid thermoplastic phase, wherein at least a portion of the rigid thermoplastic phase is chemically grafted to the rubber phase; and
   c) about 1 to 10 wt. % of at least one low molecular weight partially or fully hydrogenated hydrocarbon resin derived from petroleum $C_9$ monomer feedstock; wherein all amounts are based on the sum of the weights of components a–c inclusive of the composition.

2. The composition of claim 1 wherein the hydrocarbon resin has a numbered average molecular weight of less than 5,000.

3. The composition of claim 1 wherein the low molecular weight hydrocarbon resin derived from petroleum $C_9$ feedstock has a numbered average molecular weight of less than 2,500.

4. The composition of claim 1 wherein the second thermoplastic resin comprises structural units derived from styrene and acrylonitrile; and the rubber modified graft copolymer rubber phase comprises a polybutadiene or poly(styrene-butadiene) rubber and the rigid thermoplastic phase comprises a styrene-acrylonitrile copolymer.

5. An article fabricated from the composition of claim 1.

6. The composition of claim 1 further comprising between about 0.5 wt % and about 15 wt %, based on the weight of the components a–c of the composition, of at least one polymeric or non-polymeric organic phosphorus species selected from the group consisting of aromatic or non-aromatic phosphate esters, thiophosphate esters, phosphonate esters, thiophosphonate esters, phosphinate esters, thiophosphinate esters, phosphines, triphenylphosphine, phosphine oxides, triphenylphosphine oxide, tris(2-cyanoethyl)phosphine oxide, thiophosphine oxides, and phosphonium salts.

7. A polycarbonate resin composition comprising:
   a) at least one aromatic polycarbonate;
   b) about between 0 wt % and about 50 wt % of a second thermoplastic resin comprising structural units derived from one or more monomers selected from the group consisting of vinyl aromatic monomers, monoethylenically unsaturated nitrile monomers, and $C_1$–$C_{12}$ alkyl (meth)acrylate monomers; the second thermoplastic resin; and
   c) about 1 to 10 wt. % of at least one low molecular weight partially or fully hydrogenated hydrocarbon resin derived from petroleum $C_9$ monomer feedstock; wherein all amounts are based on the sum of the weights of components a–c inclusive of the composition,
   wherein the polycarbonate comprises a blend of a first polycarbonate not comprising siloxane units and as a second polycarbonate a linear multiblock copolymer of bisphenol A polycarbonate and polydimethylsiloxane.

8. An article fabricated from the composition of claim 7.

9. The composition of claim 7, further comprising between about 0.5 wt % and about 15 wt %, based on the weight of the components a–c of the composition, of at least one polymeric or non-polymeric organic phosphorus species selected from the group consisting of aromatic or non-aromatic phosphate esters, thiophosphate esters, phosphonate esters, thiophosphonate esters, phosphinate esters, thiophosphinate esters, phosphines, triphenylphosphine, phosphine oxides, triphenylphosphine oxide, tris(2-cyanoethyl)phosphine oxide, thiophosphine oxides, and phosphonium salts.

10. A method for improving polycarbonate resin composition performance comprising blending:
   a) at least one aromatic polycarbonate, wherein the polycarbonate is a blend of a first polycarbonate not comprising siloxane units and as a second polycarbonate a linear multiblock copolymer of bisphenol A polycarbonate and polydimethylsiloxane;
   b1) about between 4 wt % and about 30 wt % of a second thermoplastic resin which is not a polycarbonate;
   b2) about between 5 wt % and about 30 wt % of one rubber modified graft copolymer comprising a discontinuous rubber phase dispersed in a continuous rigid thermoplastic phase, wherein at least a portion of the rigid thermoplastic phase is chemically grafted to the rubber phase;
   c) about 1 to 1.0 wt. % of at least one partially or fully hydrogenated low molecular weight hydrocarbon resin derived from petroleum $C_9$ monomer feedstock;
wherein all amounts are based on the weight of components a–c inclusive of the composition.

11. The method of claim 10 wherein the hydrocarbon resin has a numbered average molecular weight of less than 5,000.

12. The method of claim 10 wherein the second thermoplastic resin comprises structural units derived from styrene and acrylonitrile; and the rubber modified graft copolymer rubber phase comprises a polybutadiene or poly (styrene-butadiene) rubber and the rigid thermoplastic phase comprises a styrene-acrylonitrile copolymer.

13. The method of claim 10 wherein the low molecular weight hydrocarbon resin derived from petroleum $C_9$ feedstock has a numbered average molecular weight of less than 2,500.

14. The method of claim 10 further comprising between about 0.5 wt % and about 15 wt %, based on the weight of the components a–c of the composition, of at least one polymeric or non-polymeric organic phosphorus species selected from the group consisting of aromatic or non-aromatic phosphate esters, thiophosphate esters, phosphonate esters, thiophosphonate esters, phosphinate esters, thiophosphinate esters, phosphines, triphenylphosphine, phosphine oxides, triphenylphosphine oxide, tris(2-cyanoethyl)phosphine oxide, thiophosphine oxides, and phosphonium salts.

* * * * *